United States Patent
Ko et al.

(10) Patent No.: US 11,832,314 B2
(45) Date of Patent: Nov. 28, 2023

(54) DEEP REINFORCEMENT LEARNING-BASED RANDOM ACCESS METHOD FOR LOW EARTH ORBIT SATELLITE NETWORK AND TERMINAL FOR THE OPERATION

(71) Applicant: Korea University Research and Business Foundation, Seoul (KR)

(72) Inventors: Young Chai Ko, Seoul (KR); Ju Hyung Lee, Goyang-si (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/718,564

(22) Filed: Apr. 12, 2022

(65) Prior Publication Data

US 2023/0189353 A1   Jun. 15, 2023

(30) Foreign Application Priority Data

Dec. 14, 2021 (KR) .......................... 10-2021-0179052
Feb. 15, 2022 (KR) .......................... 10-2022-0019492

(51) Int. Cl.
*H04W 74/08* (2009.01)
*H04W 72/04* (2023.01)
(Continued)

(52) U.S. Cl.
CPC .......... *H04W 74/085* (2013.01); *H04B 7/195* (2013.01); *H04W 72/0446* (2013.01); *H04W 74/0866* (2013.01); *H04W 84/06* (2013.01)

(58) Field of Classification Search
CPC .......... H04W 74/085; H04W 72/0446; H04W 74/0866; H04W 84/06; H04B 7/195
See application file for complete search history.

(56) References Cited

U.S. PATENT DOCUMENTS 10,588,034 B1 *   3/2020   Dowlatkhah ......... H04W 4/029
10,749,594 B1 *   8/2020   O'Shea ................. G06N 3/045
(Continued)

FOREIGN PATENT DOCUMENTS

KR    10-2014-0004772 A    1/2014

OTHER PUBLICATIONS

Lee, Ju-Hyung, et al. "Learning Emergent Random Access Protocol for LEO Satellite Networks." *arXiv preprint arXiv:2112.01765* (Dec. 3, 2021). pp. 1-13.

*Primary Examiner* — Bailor C Hsu
(74) *Attorney, Agent, or Firm* — NSIP Law (57) ABSTRACT

A random access method for a terminal with the processor and the memory to access a low earth orbit satellite network formed by multiple low earth orbit satellites (LEO SAT) includes: the stage where a Deep Reinforcement Learning (DRL) algorithm is applied for a pre-set time to decide which one between the first and the second actions should be performed at every access cycle, and to perform the random access to the low earth orbit satellite network based on the above decision while learning it; and the stage where, according to the learning result of the DRL algorithm performed for above pre-set time, it decides which of the first and the second actions should be chosen when attempting to access the low earth orbit satellite network at a new access cycle and then to perform the random access to the low earth orbit satellite network according to the above choice.

11 Claims, 10 Drawing Sheets

(51) Int. Cl.
    *H04B 7/195*     (2006.01)
    *H04W 72/0446*     (2023.01)
    *H04W 84/06*     (2009.01)

(56) References Cited

U.S. PATENT DOCUMENTS

| | | | | |
|---|---|---|---|---|
| 2018/0192443 | A1* | 7/2018 | Novlan | H04W 76/11 |
| 2020/0314916 | A1* | 10/2020 | Park | H04W 4/40 |
| 2021/0058149 | A1* | 2/2021 | Nuttall | H04B 7/18517 |
| 2021/0058936 | A1* | 2/2021 | Gordaychik | H04W 72/23 |
| 2021/0287559 | A1* | 9/2021 | Jeong | G05D 1/0022 |
| 2022/0014963 | A1* | 1/2022 | Yeh | G06N 7/01 |
| 2022/0044091 | A1* | 2/2022 | Sundararajan | G06N 3/08 |
| 2022/0101204 | A1* | 3/2022 | Ly | G06N 20/10 |
| 2022/0377614 | A1* | 11/2022 | Balakrishnan | H04W 28/0925 |
| 2022/0417981 | A1* | 12/2022 | Li | H04W 74/0841 |

\* cited by examiner

| Division | Collision probability | Connection delay time [ms] |
|---|---|---|
| Conventional method | 0.1451 | 224.1 |
| This invention | 0.1341 | 160.1 |

[Fig. 10]

| Division | Collision probability | Delay time [ms] |
|---|---|---|
| Conventional method | 0.1338 | 293.1 |
| This invention | 0.4000 | 151.2 |

DEEP REINFORCEMENT LEARNING-BASED RANDOM ACCESS METHOD FOR LOW EARTH ORBIT SATELLITE NETWORK AND TERMINAL FOR THE OPERATION

CROSS-REFERENCE TO RELATED APPLICATIONS

This application claims the benefit under 35 USC § 119(a) of Korean Patent Application Nos. 10-2021-0179052 filed on Dec. 14, 2021 and 10-2022-0019492 filed on Feb. 15, 2022, in the Korean Intellectual Property Office, the entire disclosures of which are incorporated herein by reference for all purposes.

TECHNICAL FIELD

This invention is on a deep reinforcement learning (DRL)-based random access method for a low earth orbit satellite network and the terminal for it. More specifically, it relates to a method and apparatus capable of minimizing the access collision and the access delay time by using the information independently obtainable from a satellite antenna terminal.

BACKGROUND

A low earth orbit satellite network is the one that arranges a number of low earth orbit satellites around 1,000 km, which is lower than the normal geostationary satellite orbit of 36,000 km, to communicate with user equipment (UE) on the ground, allowing the mobile communication services anywhere in the world. As it can support wide coverage and acquire high-speed communication speed, it is reckoned a next-generation network technology that can replace the conventional terrestrial network technology. Therefore, it is being researched and developed at various national levels and by companies.

Meanwhile, the terrestrial networks and the conventional satellite communication systems use the noticed access technique called random access, when a user initially accesses a base station or performs the handover. It can be viewed as a procedure for the user terminal to acquire the uplink synchronization with the serving cell. However, when this random access technique is applied to the low earth orbit satellite communication to perform the initial access or the handover between a user terminal on the ground and a stationary low earth orbit satellite, its access performance gets significantly lowered due to long communication distance and propagation delay.

Furthermore, if a large number of user terminals are connected to a small number of low earth orbit satellites, the access performance can be so lowered that it greatly affects the overall network performance. Therefore, a new and progressive random access method considering the unique characteristics of low earth orbit satellite networks is required. This invention relates to this.

PRIOR ART

Patent Document

Republic of Korea Patent Publication No. 10-2014-0004772 (Jan. 13, 2014)

Problems to be Solved

A technical task of this invention is to develop a DRL-based random access method for a low earth orbit satellite network and a terminal for it so that, even when initial access or handover is performed in a low earth orbit satellite network system, the access collisions with other user terminals should be minimized through the fewer access attempts to improve the access performance.

Another technical task of this invention is to develop a DRL-based random access method for a low earth orbit satellite network and a terminal for it so that the access delay performance should be improved as a result of minimized access collisions with other user terminals The technical tasks of this invention are not limited to those mentioned above, and other technical tasks not mentioned yet will be clearly understood by the ordinary technicians from the following descriptions.

SUMMARY

As an implementation example of this invention for achieving the above technical tasks, the random access method for a terminal with a processor and a memory according to access a low earth orbit satellite network formed by multiple low earth orbit satellites (LEO SAT) can include two stages: (a) the stage where a Deep Reinforcement Learning (DRL) algorithm is applied for a pre-set time to determine which one of the first action and the second action to perform every access cycle, and to perform the random access to the low earth orbit satellite network based on the above decision while learning it, and (b) the stage where, according to the learning result of the DRL algorithm performed for above pre-set time, the system determines which of the first and the second actions should be chosen when attempting to access the low earth orbit satellite network at a new access cycle and then to perform the random access to the low earth orbit satellite network according to the above choice. The first action mentioned above is to attempt an access by selecting any PRACH preamble from any low earth orbit satellite among multiple low earth orbit satellites existing within its view angle, and the second action mentioned above is to take a reservation time for not attempting the access to the low earth orbit satellite to avoid the access collision with other terminals.

According to the implementation example, the deep reinforcement learning (DRL) algorithm may be any of Actor-Critic algorithm, Deep Deterministic Policy Gradient (DDPG) algorithm, Proximal Policy Optimization (PPO) algorithm, and Deep Q-Network (DQN) algorithm.

According to an implementation example, above stage (a) can include: stage (a-1) to enter one or more pieces of input information as a state into the DRL algorithm at each access cycle; stage (a-2) to enter the above one or more pieces of input information as a state into the DRL algorithm at each access cycle in order to output a decision on which to perform between the first and the second actions at each access cycle as an action, and to perform the random access to the low earth orbit satellite network based on the output action.

According to an implementation example, the input information mentioned above can be any one or more of information on the access collision at the last access cycle, on the current positions of multiple low earth orbit satellites, on the amount of communication obtained through the corresponding access, on the location of other terminals and on the indices at the corresponding access cycle.

According to an implementation example, the information on the current positions of multiple low earth orbit satellites may be directly received from the low earth orbit satellite network or may have been already held as the information on periodic orbits.

According to an implementation example, after above stage (a-2), the stage (a-3) to calculate the reward according to the output action mentioned above and the stage (a-4) to update the DRL algorithm according to the calculated reward.

According to an implementation example, the reward mentioned above may be one or more of followings: acquired communication amount, collision probability*(−1), and connection delay time*(−1).

According to an example, the learning goal of the DRL algorithm may be one or more of followings: minimization of access collision probability, minimization of access delay time, and maximization of communication amount acquired after access.

According to an example, the terminal with above processor and memory may be the satellite antenna installed on the ground.

As another implementation example of this invention to achieve the above technological tasks, the terminal performing the DRL-based random access method for a low earth orbit satellite network should include the memory enough to load one or more processors, a network interface, and a computer program executed by the processors as well as the storage to save a large-capacity network data and the above-mentioned computer program. Here, the above computer program executes the following operations by above one or more processors: (A) the operation to apply a deep reinforcement learning (DRL) algorithm for a pre-set time to decide which one between the first and the second actions at every access cycle and to carry out a random access to the low earth orbit satellite network according to above decision, while learning about it, and (B) the operation to decide one of the first and the second actions at a new access cycle according to the learning result of the DRL algorithm which has been made for the pre-set time as mentioned above, and to perform the random access to the low earth orbit satellite network based on the decision. The first action mentioned above is to attempt an access by selecting any PRACH preamble from any low earth orbit satellite among multiple low earth orbit satellites existing within its view angle, and the second action mentioned above is to take a reservation time for not attempting the access to the low earth orbit satellite to avoid the access collision with other terminals.

According to another implementation example of this invention to achieve the above technological tasks, the computer program stored in the medium is combined with a computing device to carry out the following stages: (AA) the stage to apply a deep reinforcement learning (DRL) algorithm for a pre-set time to decide which one between the first and the second actions at every access cycle and to carry out a random access to the low earth orbit satellite network according to above decision, while learning about it, and (BB) the stage to decide which one between the first and the second actions at a new access cycle according to the learning result of the DRL algorithm which has been made for the pre-set time as mentioned above, and to perform the random access to the low earth orbit satellite network based on the decision. The first action mentioned above is to attempt an access by selecting any PRACH preamble from any low earth orbit satellite among multiple low earth orbit satellites existing within its view angle, and the second action mentioned above is to take a reservation time for not attempting the access to the low earth orbit satellite to avoid the access collision with other terminals.

Effects of Invention

According to this invention as described above, the satellite antenna, which is a terminal including a processor and a memory, learns how to access a low earth orbit satellite by applying a DRL algorithm for a pre-set time. Even when performing initial access or handover, it can make fewer access attempts and minimize the access collisions with other user terminals. Thus, it can improve the access performance.

In addition, by minimizing the access collision with other user terminals, it can considerably reduce the access delay.

The effects of this invention are not limited to the above-mentioned effects, and the effects not mentioned here will be clearly understood by the ordinary technicians from the description below.

DETAILED DESCRIPTION

The purpose and technical configuration of this invention as well as the operational effects thereof will be more clarified by the following detailed description based on the accompanying drawings of this invention. The implementation examples of this invention will be described in detail with reference to the accompanying drawings.

The implementation examples in this specification should not be construed or used as limiting the scope of this invention. It is natural that the descriptions in this specification will have various applications for the ordinary technicians in the field. Accordingly, the examples in the detailed description of this invention are illustrative for better description of this invention, and any of them should not be considered to limit the application scope of this invention.

The functional blocks in the drawings below are merely examples of possible implementations. In other implementations, other functional blocks may be used without departing from the idea and scope of the detailed description. In addition, although one or more functional blocks of this invention are represented as separate blocks, they may be combinations of various hardware and software configurations that perform the same function.

And the expression to include certain components is just an "open type" expression that indicates the relevant components, and should not be construed as excluding additional components.

Furthermore, when a component is said to be "connected" or "linked" to another component, it may be directly connected or linked to the other component or there may be another component between them.

Hereinafter, the detailed implementation examples of this invention will be described with reference to the drawings.

Figure 1:
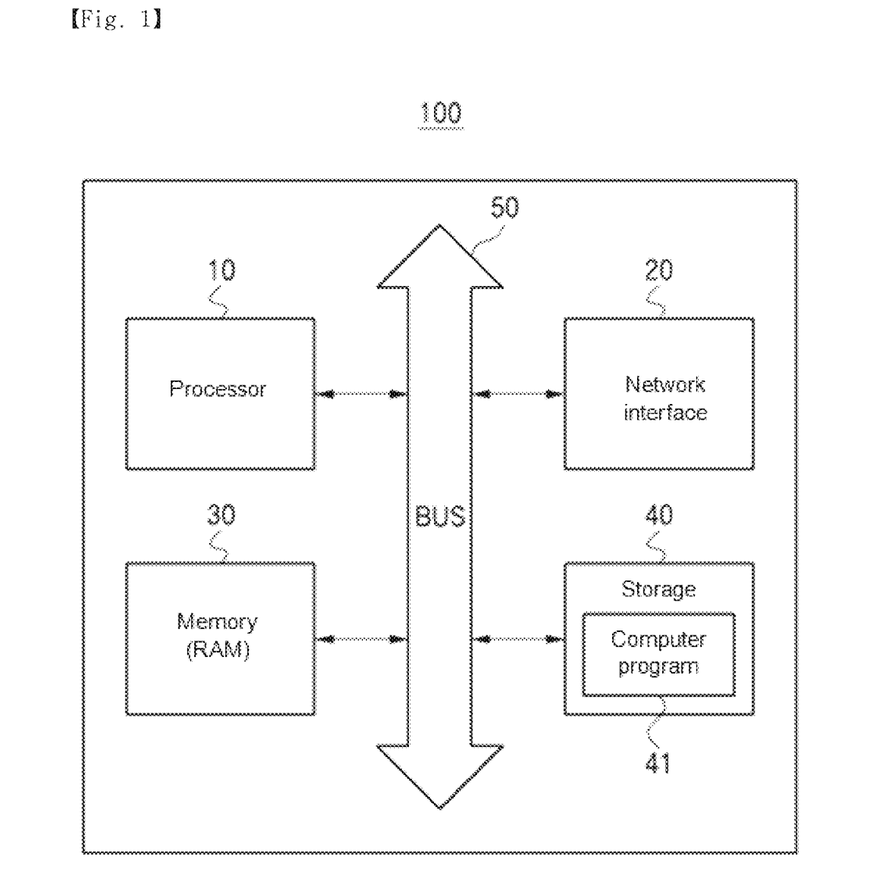
FIG. 1 is a diagram exemplarily showing the entire configuration of the terminal performing the DRL-based random access method for a low earth orbit satellite network according to the first implementation example of this invention.

FIG. 1 is a diagram exemplarily showing the entire configuration of the terminal 100 performing the DRL-based random access method for a low earth orbit satellite network according to the first example of this invention.

However, it is only a preferred implementation example for achieving the purpose of this invention. Some components may be added or deleted, if necessary, and a role performed by one component may be performed by another component.

As the first implementation example of this invention, the terminal (100) that performs the DRL-based random access method for a low earth orbit satellite network includes a processor (10), a network interface (20), a memory (30), a storage (40), and a data bus (50) for connecting them. Of course, it may further include additional components required to achieve the purpose of this invention.

The processor (10) controls the overall operation of all components. The processor (10) may be any of a central processing unit (CPU), a microprocessor unit (MPU), a micro controller unit (MCU), or other one widely known in the technical field to which this invention pertains. The processor (10) should be able to perform at least one application or program for performing the DRL-based random access to the low earth orbit satellite network according to the second implementation example of this invention.

The network interface (20) supports the wired/wireless Internet communication of the terminal (100) to perform the DRL-based random access method for a low earth orbit satellite network according to the first implementation example of this invention. It can also support other known communication methods. Accordingly, the network interface (20) may be configured to include the corresponding communication module.

The memory (30) stores various types of commands and/or information, to which one or more computer programs (41) can be loaded from the storage (40) to perform the DRL-based random access method for a low earth orbit satellite network according to the second example of this invention. Although RAM is illustrated as the memory (30) in FIG. 1, various storage media can be used as the memory (30).

The storage (40) can store one or more computer programs (41) and mass network information (42) non-temporarily. The storage (40) is a non-volatile memory such as a read only memory (ROM), an erasable programmable ROM (EPROM), an electrically erasable programmable ROM (EEPROM), a flash memory, a hard disk, a removable disk, or other widely known computer-readable recording media in the technical field to which this invention pertains.

The computer program (41) is loaded into the memory (30), and performs the following operations by one or more processors (10): (A) the operation to apply a deep reinforcement learning (DRL) algorithm for a pre-set time to decide which one between the first and the second actions at every access cycle and to carry out a random access to the low earth orbit satellite network according to above decision, while learning about it, and (B) the operation to decide which one between the first and the second actions at a new access cycle according to the learning result of the DRL algorithm which has been made for the pre-set time as mentioned above, and to perform the random access to the low earth orbit satellite network based on the decision. The first action mentioned above is to attempt an access by selecting any PRACH preamble from any low earth orbit satellite among multiple low earth orbit satellites existing within its view angle, and the second action mentioned above is to determine a reservation time for not attempting the access to the low earth orbit satellite to avoid the access collision with other terminals.

The operations performed by the computer program (41) simply mentioned above can be viewed as a function of the computer program (41). More detailed description will be made later when describing the DRL-based random access method for a low earth orbit satellite network according to the second implementation example of this invention.

The data bus (50) serves as the path for commands and/or information between the processor (10), the network interface (20), the memory (30), and the storage (40) described above.

Figure 2:
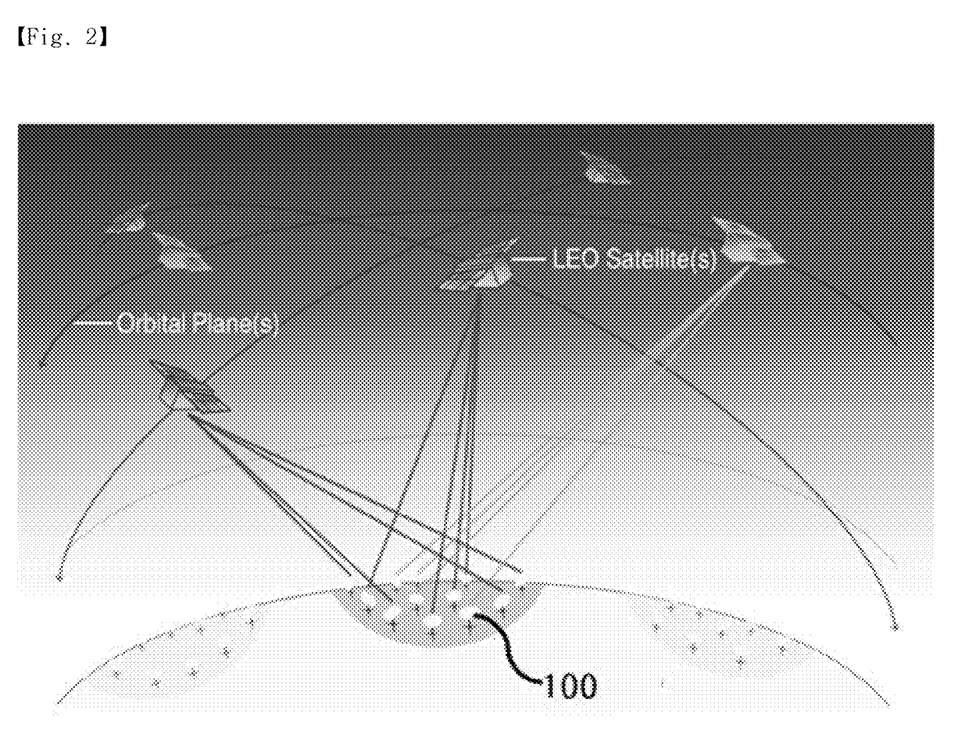
FIG. 2 is a diagram exemplarily illustrating a low earth orbit satellite network system including a satellite antenna installed on the ground.

The terminal (100) that performs the DRL-based random access method for a low earth orbit satellite network according to the first example of this invention described above is the user equipment (UE), which may be fixed on the ground or have mobility. It can be called other terms such as wireless device, MS (Mobile Station), UT (User Terminal), SS (Subscriber Station), MT (Mobile Terminal), etc. In this invention for the low earth orbit satellite network, a satellite antenna installed on the ground, as exemplarily shown in FIG. 2, is set as the terminal (100) that performs the DRL-based random access method for a low earth orbit satellite network.

Hereinafter, it is supposed that a satellite antenna installed on the ground is the terminal (100) that performs the DRL-based random access method for a low earth orbit satellite network according to the first example of this invention. On this premise, the DRL-based random access method for a low earth orbit satellite network according to a second example of this invention will also be described with reference to FIGS. 3 to 9.

Figure 3:
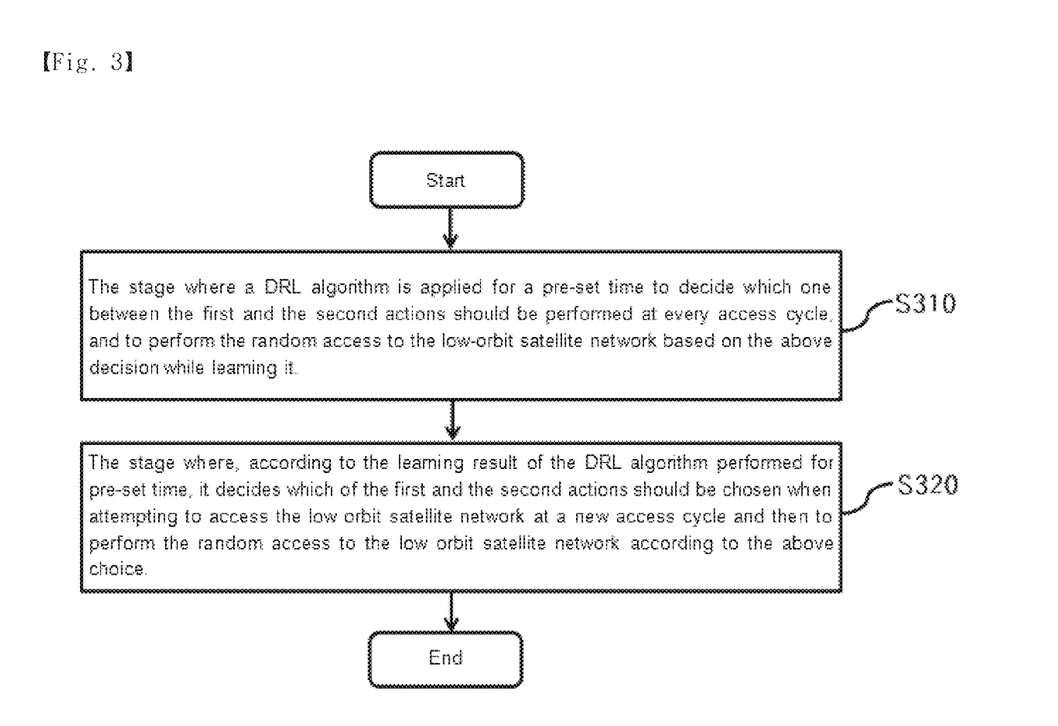
FIG. 3 is a flowchart illustrating the representative stages of DRL-based random access method for a low earth orbit satellite network according to the second implementation example of this invention.

FIG. 3 is a flowchart illustrating representative steps of a DRL-based random access method for a low earth orbit satellite network according to a second example of this invention.

However, this is only a preferred example in achieving the purpose of this invention, so some steps may be added or deleted, if necessary, and a step may be incorporated in another step.

Each step is assumed to be achieved through the terminal (100) that performs the DRL-based random access method for a low earth orbit satellite network according to the first example of this invention. For convenience, the system including the processor and the memory is called the terminal (100).

First, the terminal (100) with the processor and the memory applies the Deep Reinforcement Learning (DRL) algorithm for a pre-set time to decide which one of the first and the second actions is to be performed at every access cycle and performs the random access to the low earth orbit satellite network according to the decided result while learning it (S310).

Here, the DRL algorithm may be any of Actor-Critic algorithm, Deep Deterministic Policy Gradient (DDPG) algorithm, Proximal Policy Optimization (PPO) algorithm, Deep Q-Network (DQN) algorithm, or other known DRL algorithm. Accordingly, the terminal (100) with the processor and the memory may include the artificial intelligence processor embedded with a DRL algorithm model, which can be viewed as a kind of DRL algorithm model.

Meanwhile, the access cycle is the interval between the time when the terminal (100) with the processor and the memory fixed on the ground loses its connection with a low earth orbit satellite due to the moving-away of the satellite out of the antenna's viewing angle and the time when it attempts a new access to a low earth orbit satellite that is entering the antenna's viewing angle. Since all low earth orbit satellites move all the time, it is usual that the access cycle is repeated continuously.

Any of the first and the second actions decided in the step S310 means the action mentioned in the DRL algorithm. The first action is to make an attempt to access by selecting the PRACH preamble for any low earth orbit satellite among multiple low earth orbit ones existing within the viewing angle (Association Decision), and the second action is to take a reservation time to avoid access collision with other terminals (Backoff Decision). The device (100) with the processor and the memory continuously learns the result of performing random access according to one of these two actions and the decided action at every access cycle.

Here, the learning is performed for a pre-set time. If it is made for a too short time, the learning might be incomplete. If it is made for a too long time, the learning might be complete but the time to enter the actual low earth orbit satellite network service becomes late, causing the operational costs. Therefore, it is desirable to perform the learning for about 24 hours, but it is not necessarily limited thereto.

When there are multiple terminals (100), or satellite antennas, with the processor and the memory, each of the satellite antennas may perform the learning. Each satellite antenna transmits its learning results in real time or periodically to the central server (not shown in the figure) or so. Then, the central server shares the results with all other satellite antennas to learn them together by referring to the learning results of other satellite antennas, which become the "Agents" in the DRL algorithm.

The random access to the low earth orbit satellite network performed by the terminal (100) with the processor and the memory according to the decision result may be a 4-Step or 2-Step RACH access, on which the detailed description is omitted because it is a well-known method.

The Step S310 to perform the learning described above is the key of the DRL-based random access method for a low earth orbit satellite network according to the second example of this invention in which the DRL algorithm is applied to the low earth orbit satellite network. Therefore, it will be explained later.

Figure 4:
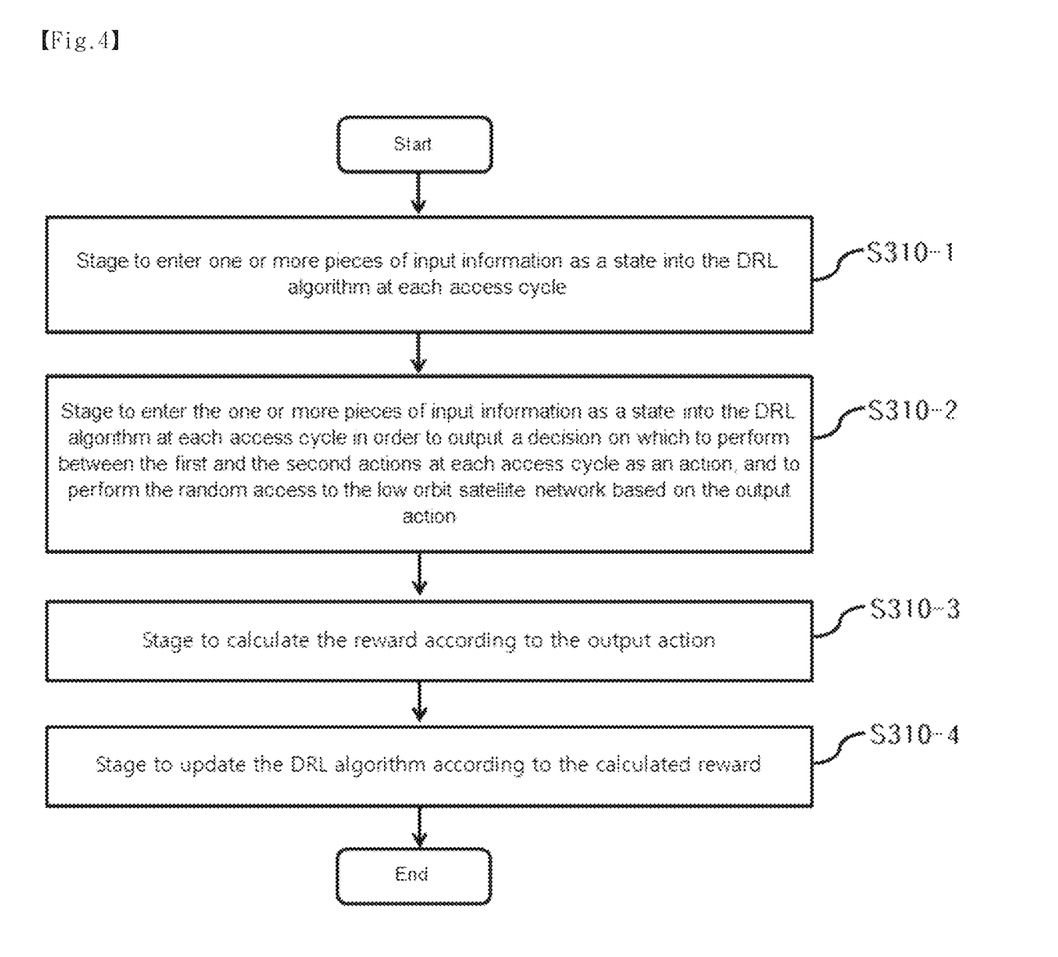
FIG. 4 is a flowchart illustrating the step S310 of learning in the DRL-based random access method for a low earth orbit satellite network according to the second implementation example of this invention.

FIG. 4 is a flowchart illustrating the step S310 of learning in the DRL-based random access method for a low earth orbit satellite network according to the second example of this invention.

However, it is only a preferred example in achieving the purpose of this invention, and some steps may be added or deleted, if necessary, and a step may be incorporated in another step.

First, the terminal (100) with the processor and the memory enters one or more inputs of information as the state into the DRL algorithm at each access cycle (S310-1).

In the DRL, the state refers to a set of values indicating what the situation is at the present time. In this invention applied to a low earth orbit satellite network, the input information corresponding to the state may include the information on the confliction of access at the last access cycle, on the current positions of multiple low earth orbit satellites, on the communication amount obtained as a result at the corresponding access cycle, on the locations of other terminals, and on the index at the corresponding access cycle.

Here, the information on the current positions of multiple low earth orbit satellites may be directly received from the low earth orbit satellite network, or may have been already held as the information on periodic orbits.

As the above input information corresponding to the state is locally observable by the satellite antenna terminal or the agent in consideration of the specificity of low earth orbit satellite network, it will be very efficient because it does not require any inter-agent communication with other terminals or centralized training.

By applying one or more pieces of input information as the state to the DRL algorithm, the terminal (100) with the processor and the memory makes an output decision on which of the first and the second actions is to be performed at every access cycle as the action, and performs the random access to the low earth orbit satellite network according to the output action (S310-2).

The action in the DRL algorithm means an option that can be taken, and it is an output value derived by entering the input information into the DRL. As explained earlier, first action is to make an attempt to access by selecting the PRACH preamble for any low earth orbit satellite among multiple low earth orbit ones existing within the viewing angle, and the second action is to take a reservation time to avoid access collision with other terminals for one or more low earth orbit satellites existing within the viewing angle.

Thereafter, the reward is calculated by the terminal (100) with the processor and the memory according to the action output (S310-3).

The reward mentioned in the DRL algorithm refers to the gain obtained when the agent performs a certain action. In consideration of the specificity of the low earth orbit satellite network, any one or more of obtained communication amount, collision probability*(−1), and access delay time* (−1) may become the calculated reward.

The general reward is, as it is, more meaningful when it is higher. The obtained communication amount corresponds to this. And the multiplication of the reward by −1 is called the "Cost", which is more meaningful when lower. Collision probability and connection delay time will be the case. That is, the performance of the low earth orbit satellite network is more excellent as the obtained communication amount is larger, the collision probability is lower, and the connection delay time is shorter. Therefore, the learning goal of the DRL algorithm applied to this invention can be the maximization of communication amount obtained after access, or the minimization of access collision probability and of access delay time.

Once the reward is calculated, the DRL algorithm is updated according to the reward calculated by the terminal (100) with the processor and the memory (S310-4).

Figure 5:
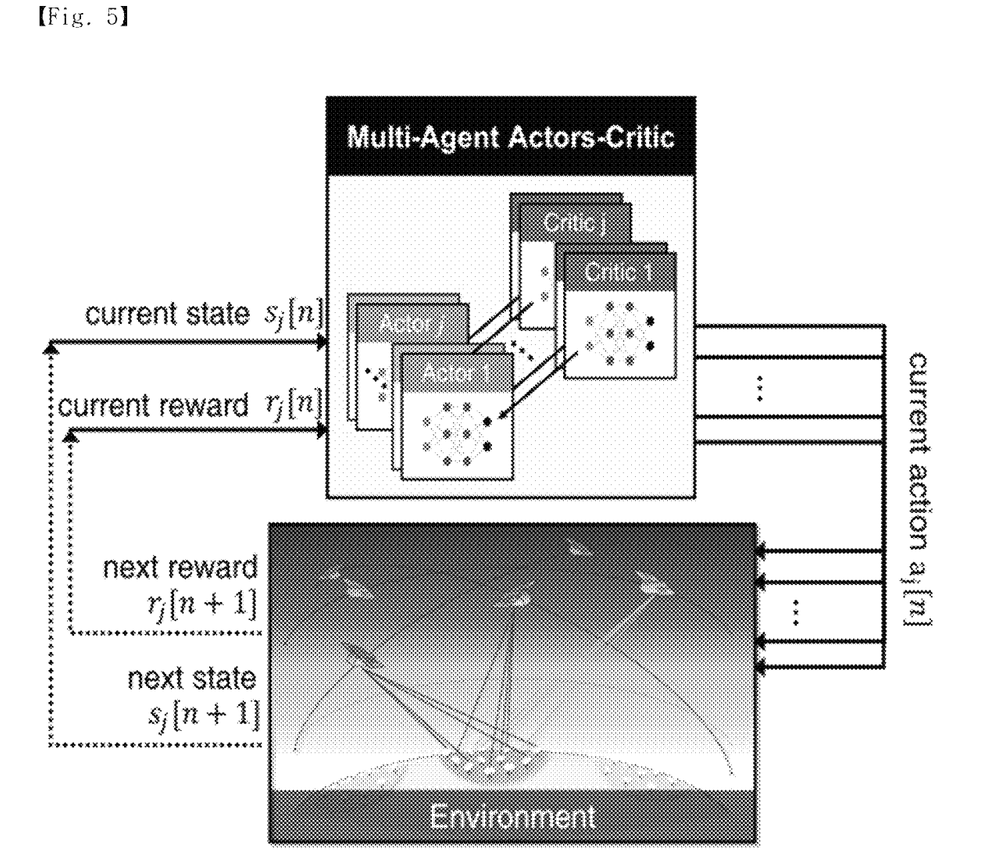
FIG. 5 is a schematic diagram illustrating the steps S310-1 to S310-4 when the DRL algorithm is used as the Actor-Critic algorithm.

Here, the update of DRL algorithm can be viewed as learning. FIG. 5 schematically shows the steps S310-1 to S310-4 where the Actor-Critic algorithm is used as the DRL algorithm.

Let's go back to the description of FIG. 3.

Once the learning is completed for the pre-set time, the terminal (100) with the processor and the memory decides the first or second action when trying to make a random access to the low earth orbit satellite network at a new access cycle according to the learning result of the DRL algorithm performed for the pre-set time. Then, it performs the random access according to the decision (S320).

Figure 6:
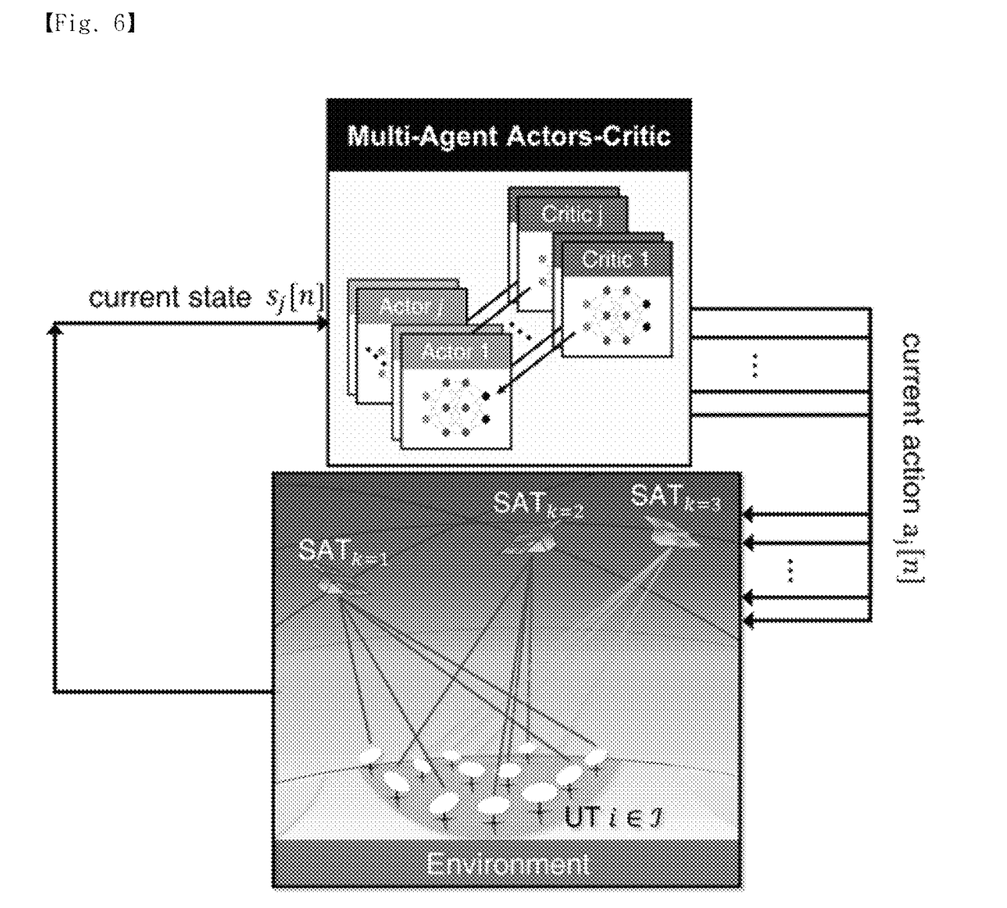
FIG. 6 is a schematic diagram of step S320 when the DRL algorithm is used as the Actor-Critic algorithm.

Step S320 is the same as step S310 in that it decides one of the first and the second actions by applying the DRL algorithm, but it is different in that the DRL algorithm (or model) is the one in which the learning has been completed for a pre-set time. Therefore, step S310 can be viewed as a learning step and step S320 as an execution step. FIG. 6 shows the step S320 when the Actor-Critic algorithm is used as the DRL algorithm, on which the description of the steps is replaced by the schematic diagram.

Figure 7:
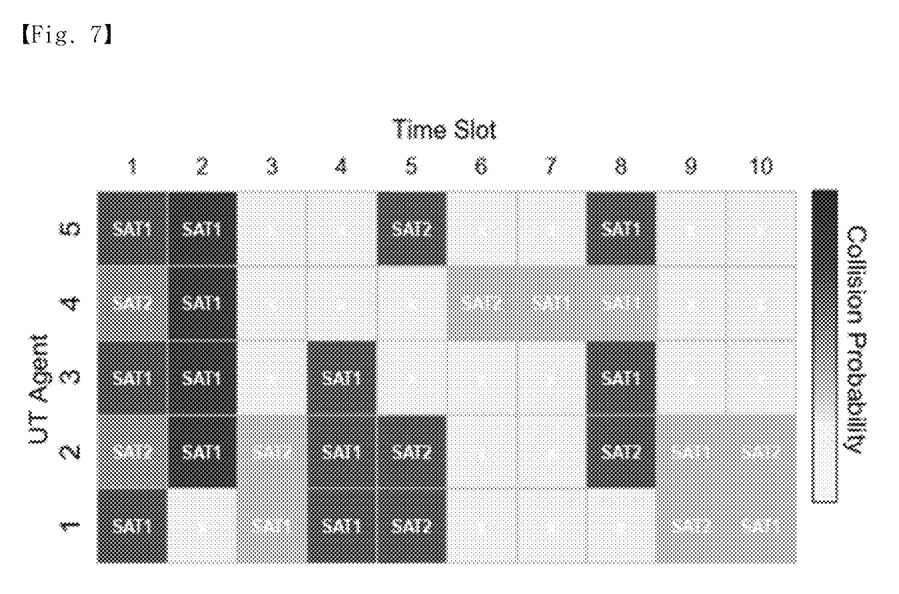
FIG. 7 is a simulation result of access collision probability with the time slots of 5 satellite antennas in the conventional random access method used in LTE and NR cellular communication.
Figure 8:
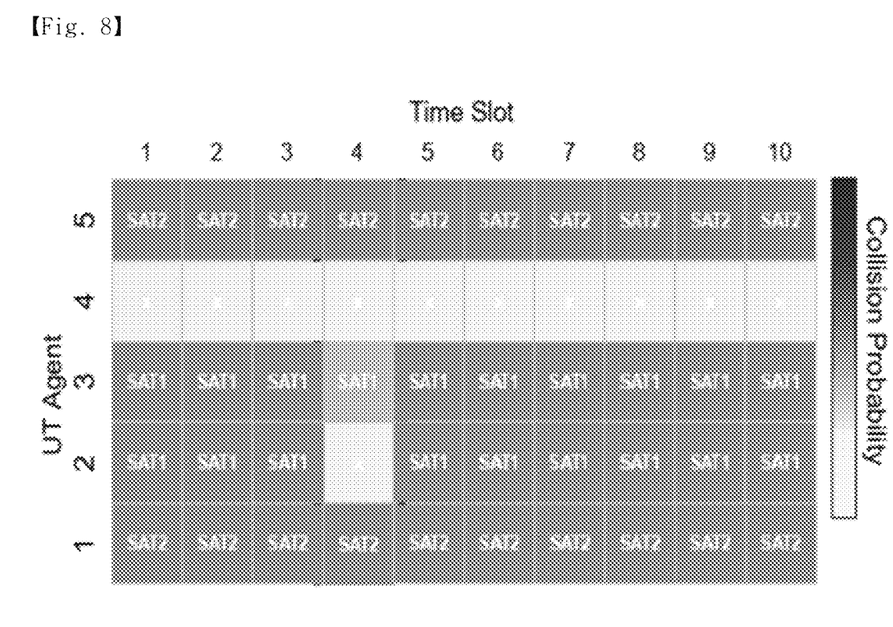
FIG. 8 is a simulation result of access collision probability with the time slots of 5 satellite antennas according to the DRL-based random access method for a low earth orbit satellite network according to the second implementation example of this invention.

FIG. 7 is a simulation result of access collision probability through the time slots of 5 satellite antennas in the conventional random access method for LTE and NR cellular communication. FIG. 8 is a simulation result of access collision probability through the time slots of 5 satellite antennas in the DRL-based random access method for a low earth orbit satellite network according to the second implementation example of this invention.

When comparing FIGS. 7 and 8, it can be seen that the DRL-based random access method for a low earth orbit satellite network according to the second implementation example of this invention understands more other satellite antenna access attempts and is selecting the backoff, which decides the reservation time for not attempting the access, more efficiently to avoid access collision with other terminals.

Figure 9:
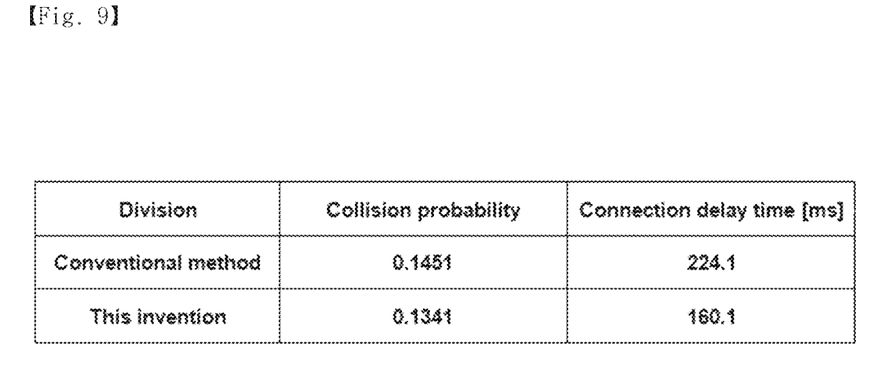
FIG. 9 is a table comparing the collision probability and access delay time between the conventional random access method and the new DRL-based random access method for a low earth orbit satellite network according to the second implementation example of this invention in the low density satellite antennas environment.

FIG. 9 shows a table comparing the collision probability and connection delay time when the access is performed in the conventional random access method and in the DRL-based random access method for a low earth orbit satellite network according to the second implementation example of this invention in a low-density (sparse) environment of the terminal (100) with the processor and the memory. In the table, it can be seen that the DRL-based random access method for a low earth orbit satellite network according to the second implementation example of this invention has a low probability of collision and also shortens the access delay time because the backoff is efficiently selected. Therefore, it is confirmed that the DRL-based random access method according to the second implementation example of this invention is superior to that of the conventional random access method.

Figure 10:
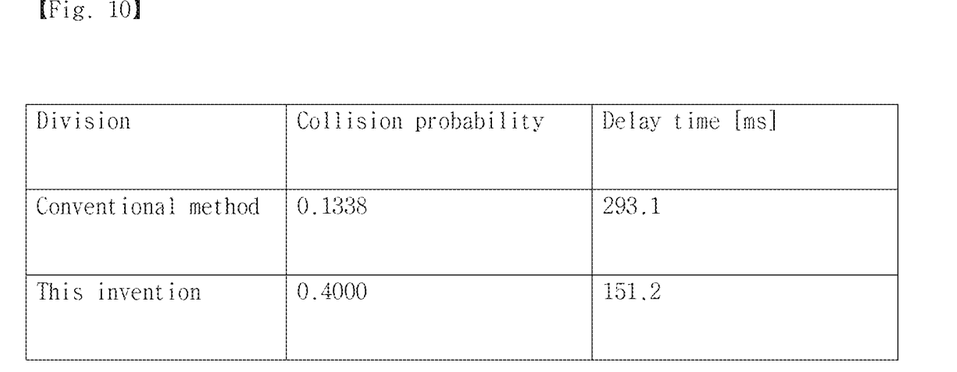
FIG. 10 is a table comparing the collision probability and access delay time between the conventional random access method and the new DRL-based random access method for a low earth orbit satellite network according to the second implementation example of this invention in the high density satellite antennas environment.

This is just a connection performance result in the situation where the density of the equipment (100) with the processor and the memory—more specifically, how many other satellite antennas are arranged in the radius of the satellite antenna installed on the ground—is relatively low. Referring to FIG. 10, which shows a table comparing the collision probability and connection delay time in the conventional random access method and in the DRL-based random access method for a low earth orbit satellite network according to the second implementation example of this invention in a high-density (dense) environment of the terminal (100) with the processor and the memory, the connection delay time of DRL-based method according to the second implementation example of this invention is, as in FIG. 9, significantly shortened when compared to the conventional random access method.

On the other hand, the collision probability in the conventional random access method is lower than that in the DRL-based random access method according to the second implementation example of this invention. However, in the environment where the antennas (100) are densely populated, the primary goal of the satellite antenna is to shorten the access delay time rather than to lower the collision probability. Therefore, the increase of collision probability to some extent can be tolerated if the access delay time is shortened.

So far, the DRL-based random access method for a low earth orbit satellite network according to the second implementation example of this invention has been described. In this invention, the satellite antenna or terminal (100) with the processor and the memory learns how to access the low earth orbit satellite by applying a deep reinforcement learning (DRL) algorithm for a pre-set time. Therefore, even when performing an initial access or handover, it can improve the access performance by minimizing the access conflicts with other user terminals while performing fewer access attempts. In addition, by minimizing the access collision with other user terminals, it can also realize the shorter access delay performance.

On the other hand, the terminal (100) to perform the DRL-based random access method for a low earth orbit satellite network according to the first and the second implementation examples of this invention can be realized as a computer program stored in the computer-readable medium according to the third implementation examples of this invention, which equally includes all the technical features. In this case, combined with the computing device, the program can include the following stages: (AA) the stage to apply a DRL algorithm for a pre-set time to decide which one between the first and the second actions at every access cycle and to carry out a random access to the low earth orbit satellite network according to above decision, while learning about it, and (BB) the stage to decide which one between the first and the second actions at a new access cycle according to the learning result of the DRL algorithm which has been made for the pre-set time as mentioned above, and to perform the random access to the low earth orbit satellite network based on the decision. The first action mentioned above is to attempt an access by selecting any PRACH preamble from any low earth orbit satellite among multiple low earth orbit satellites existing within its view angle, and the second action mentioned above is to take a reservation time for not attempting the access to the low earth orbit satellite to avoid the access collision with other terminals.

Although not described in detail to avoid the redundancy, all technical features applied to the terminal (100) performing the DRL-based random access method for a low earth orbit satellite network according to the first and the second implementation examples of this invention are also applicable to the third implementation example of this invention.

Up to now, the implementation examples of this invention have been described with the accompanying drawings. Everyone with ordinary skill in the field to which this invention pertains would be able to understand that this invention can be embodied in other specific forms without changing the technical idea or essential features. Therefore, it should be recognized that the examples described above are illustrative in all respects rather than restrictive.

EXPLANATION OF CODES

10: Processor
20: Network interface
30: Memory
40: Storage
41: Computer program
50: Information bus
100: Terminal to perform DRL-based random access for low earth orbit satellite network

The invention claimed is:

1. A random access method based on deep reinforcement learning (DRL) for low earth orbit satellite network which regards to the random access methods for a device with a processor and a memory to access a low earth orbit satellite network formed by multiple low earth orbit satellites (LEO SAT);
wherein the random access method based on deep reinforcement learning for low earth orbit satellite network comprises;
a first stage, during which applying a DRL algorithm for a pre-set time to decide which action is carried out between a first action and a second action at every access cycle, and to carry out a random access to the low earth orbit satellite network according to the decision for learning the decided action; and
a second stage, during which deciding one of the first action and the second action when trying to connect at a new access cycle according to a result of the learning of the DRL algorithm, which has been made for the pre-set time, and that performs the random access to the low earth orbit satellite network based on the decision,
wherein the first action regards to an attempt an access by selecting any physical random access channel (PRACH) preamble from any low earth orbit satellite among multiple low earth orbit satellites existing within its view angle, and
wherein the second action regards to determining a reservation time for not attempting the access to the low earth orbit satellite to avoid an access collision with other terminals with respect to one or more low earth orbit satellites existing within the viewing angle.

2. The method of claim 1,
wherein the DRL is selected from the group consisting of actor-critic algorithm, DDPG (Deep Deterministic Policy Gradient) algorithm, PPO (Proximal Policy Optimization) algorithm, and DQN (Deep Q-Network) algorithm.

3. The method of claim 1,
wherein the first stage comprises the following substages;
a first substage, wherein inputting one or more input information as a state into the DRL algorithm at each access cycle; and
a second substage, wherein applying one or more input information as a state into the DRL algorithm at each access cycle for outputting a decision, on which to perform one action between the first and the second action at each access cycle, and to perform the random access to the low earth orbit satellite network based on the output action.

4. The method of claim 3,
wherein the following substages are comprised additionally after the second substage:
a third substage, wherein a reward according to the output action is estimated; and
a fourth substage, wherein the DRL algorithm according to the calculated reward is updated.

5. The method of claim 4,
wherein the reward is selected from the group consisting of acquired traffic volume, collision probability*(−1), and connection delay time*(−1).

6. The method of claim 1,
wherein the input information comprises any one or more selected from the group consisting of information on the access collision at last access cycle, information on current positions of multiple low earth orbit satellites, information on an amount of communication obtained through corresponding accesses, information on locations of other terminals and one on indices at a corresponding access cycle.

7. The method of claim 6,
wherein the information on current positions of multiple low earth orbit satellites is an information directly received from the low earth orbit satellite network, or an information that have been already held as information on periodic orbits.

8. The method of claim 1,
wherein a learning goal of the deep reinforcement learning algorithm is selected from the group consisting of minimization of access collision probability, minimization of access delay time, and maximization of acquired communication volume after access.

9. The method of claim 1,
wherein the device with the processor and the memory is a satellite antenna installed on a ground.

10. A device that performs random access based on deep reinforcement learning for a low earth orbit satellite network comprising:
one or more processors; network interface; memory that loads a computer program executed by the one or more processors; and a storage that stores large-capacity network data and the computer program,
wherein the computer program performs the following operations by the one or more processors:
applying a deep reinforcement learning (DRL) algorithm for a pre-set time to decide which one action is carried out between a first action and a second action at every access cycle, and to carry out a random access to the low earth orbit satellite network according to the decision for learning the decided action; and
deciding one of the first action and the second action when trying to connect at a new access cycle according to a result of the learning of the DRL algorithm, which has been made for the pre-set time, and that performs the random access to the low earth orbit satellite network based on the decision,
wherein the first action regards to an attempt an access by selecting any physical random access channel (PRACH) preamble from any low earth orbit satellite among multiple low earth orbit satellites existing within its view angle, and
wherein the second action regards to determining a reservation time for not attempting the access to the low earth orbit satellite to avoid an access collision with other terminals with respect to one or more low earth orbit satellites existing within the viewing angle.

11. A computer program stored on a non-transitory computer-readable medium which is combined with a computing device to perform the following stages:
- a first stage, during which applying deep reinforcement learning (DRL) algorithm for a pre-set time to decide which one action is carried out between a first action and a second action at every access cycle, and to carry out a random access to the low earth orbit satellite network according to the decision for learning the decided action; and
- a second stage, during which deciding one of the first action and the second action when trying to connect at a new access cycle according to a result of the learning of the DRL algorithm, which has been made for the pre-set time, and that performs the random access to the low earth orbit satellite network based on the decision,
- wherein the first action regards to an attempt an access by selecting any physical random access channel (PRACH) preamble from any low earth orbit satellite among multiple low earth orbit satellites existing within its view angle, and
- wherein the second action regards to determining a reservation time for not attempting the access to the low earth orbit satellite to avoid an access collision with other terminals with respect to one or more low earth orbit satellites existing within the viewing angle.

* * * * *